Dec. 1, 1925.　　　　　A. A. GROSSMANN　　　　　1,563,483
TELESCOPIC HAND LEVEL
Filed April 18, 1922
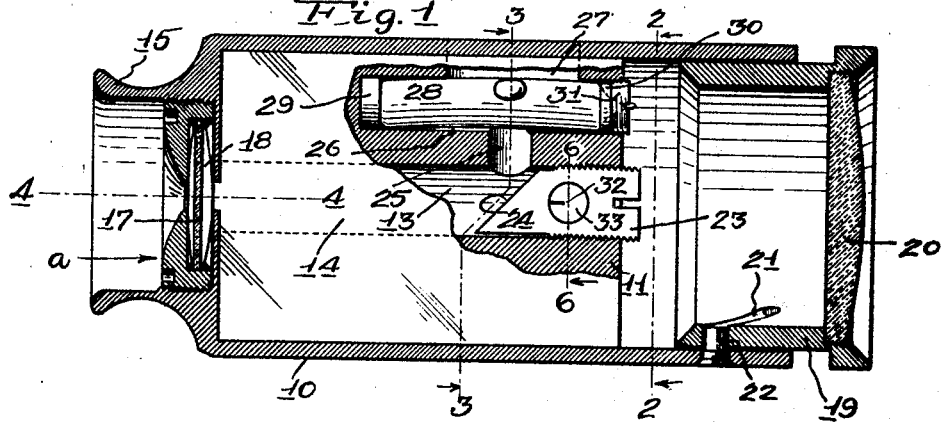
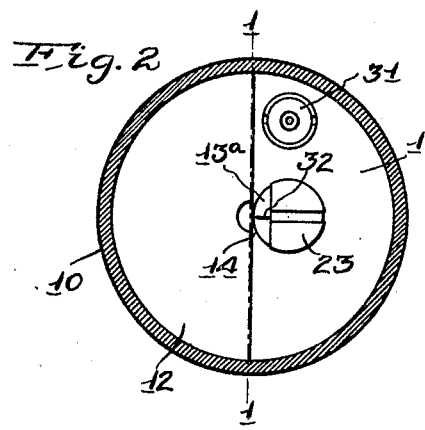 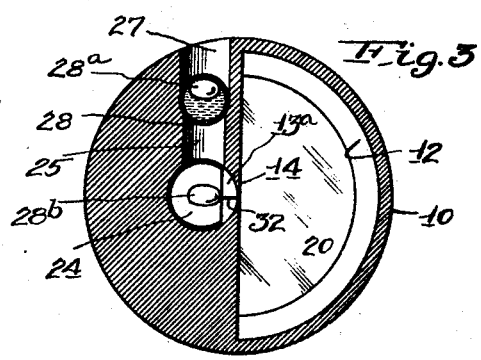
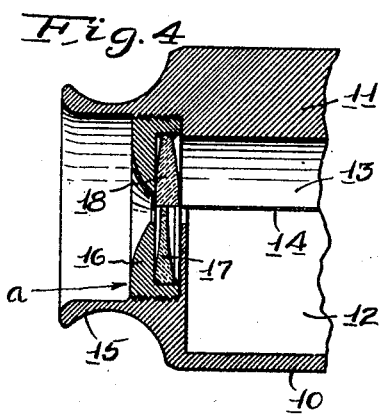 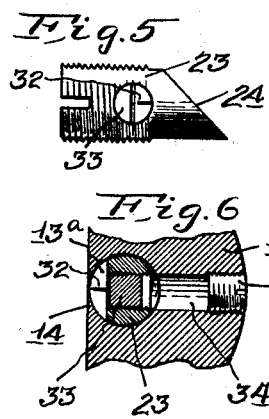 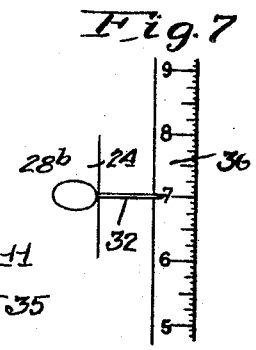
Inventor
Albert A. Grossmann
By Bradbury + Caswell
Attorneys Patented Dec. 1, 1925.

1,563,483

UNITED STATES PATENT OFFICE.

ALBERT A. GROSSMANN, OF ST. PAUL, MINNESOTA.

TELESCOPIC HAND LEVEL.

Application filed April 18, 1922. Serial No. 554,866.

*To all whom it may concern:*

Be it known that I, ALBERT A. GROSSMANN, a citizen of the United States, residing at St. Paul, in the county of Ramsey and State of Minnesota, have invented a new and useful Telescopic Hand Level, of which the following is a specification.

My invention relates to improvements in levels of the telescopic type particularly, though not exclusively, for hand use, its principal object being to provide a simple and durable instrument of the present nature with which distant levels may be easily, accurately and quickly determined.

More specifically, it is my object to provide an instrument of the single barrel type including a leveling bubble, a bubble reflector, and a pointer or leveling hair associated with said reflector, the parts being so formed and arranged that the pointer and the reflection of the bubble are both magnified, the former being associated with the image of a distant object brought into clear relief to the eye.

A further object is to supply in a single barrel device of the present nature, separate compartments and a single eye piece including a segment for each compartment, one segment co-operating with an adjustable object glass to bring distant objects into clear relief, the other segment serving to magnify the bubble reflection and pointer.

Another object is to provide for the ready correction of the relative positions between the reflector, pointer and magnifying lens segment, by supplying means of adjustment for said reflector and pointer.

An additional object resides in the co-ordination of the reflector and pointer, whereby ease in the manufacture and the assembling of the device is attained.

With the foregoing and other objects in view, which will appear in the following description, the invention resides in the novel combination and arrangement of parts and in the details of construction hereinafter described and claimed.

In the accompanying drawing, Fig. 1 is a central, longitudinal, sectional view of the device embodying my invention, a portion of the wall being broken away to disclose parts of the structure, otherwise concealed; Figs. 2 and 3 are transverse, sectional views taken, respectively, on the lines 2—2 and 3—3 of Fig. 1; Fig. 4 is a longitudinal, sectional view in detail taken on the line 4—4 of Fig. 1; Fig. 5 is an elevation illustrating the reflector plug and pointer mounting therein; Fig. 6 is a detail, sectional view taken on the line 6—6 of Fig. 1 and Fig. 7 is a diagrammatic illustration of a view as seen through my improved instrument.

In the drawing, 10 indicates a barrel-like body, which includes an integral, segmental core 11 with its inner side lying in a vertical plane intersecting the axis of said body. Said core 11, together with the opposed portion of the shell of the body 10, forms a telescopic tube or compartment 12. A longitudinal bore 13 in the core 11, closely paralleling the tube 12 is separated therefrom by the thin wall 14. An eye shielding flange 15 at one end of the body 10 is threaded internally to receive an eye-piece $a$ comprising a holder 16, a diverging lens segment 17 and a converging lens segment 18 therein. A tubular holder 19, carrying an object glass 20 is slidable in the sleeve-like end of the body 10 opposite the eye-piece $a$. A cam slot 21 in said tubular holder 19, receives a pin 22 in the body 10, said pin co-operating with said cam slot to extend or retract said holder 19 upon rotation thereof with respect to said body 10. The diverging lens segment 17 registers with the tube 12 and together with the object glass 20 supplies an adjustable telescope. The converging lens segment 18 registers with the bore 13. Threaded longitudinally in said bore, is a mutilated reflector screw 23 having an inclined reflecting surface 24 at its inner end. Communicating with this longitudinal bore 13 is a vertical bore 25, above which is a cell 26 with a window 27 opening into the same. A conventional bubble tube 28 housed within said cell 26 is fitted with abutments 29 and 30 of cork, or the like, said tube being removably held in the cell and between said abutments by means of a screw-cap 31 threaded in the end of said cell. The reflection $28^b$ of the bubble $28^a$ within the tube 28 is visible through and magnified by the converging lens segment 18. A hair-like pointer 32 is also visible through and magnified by said lens segment 18. This pointer 32 is carried in a split plug 33 threaded transversely in the reflector screw 23, said pointer being arranged parallel with, but offset from the axis of said plug 33. This pointer traverses the segmental opening $13^a$ between the reflector screw 23 and the wall 14 and is rendered clearly visible in magnified form through the lens segment 18 in the limited light admitted through the object glass 20. The elevation of the pointer 32 is adjusted by turning the plug 33 with an instrument inserted through the bore 34, after the cap screw 35 has been removed. The pointer 32 and bubble tube 28 are arranged in respect to the converging lens segment 18 so that the distance of the pointer from said lens segment is substantially equal to focal length thereof and substantially equal to the distance of the bubble tube from the reflector plus the distance of said reflector from said lens segment. By this arrangement, both pointer and bubble reflection are magnified alike. Fig. 3 shows the bubble reflection 28$^b$ and pointer 14, the latter crossing the unobstructed part 13$^a$ of the bore 13 and reaching to the thin wall 14 separating said bore 13 from the tube or compartment 12. As seen through the eye-piece $a$ (Fig. 7), said reflection 28$^b$ and pointer 32 are enlarged. A distant object, as the rod 36, is also magnified through the telescopic side of the instrument, the images seen through the two lens segments 17 and 18 being so related that the image of the distant object blends with the image of the pointer, thus allowing the visual lapping of the pointer upon the distant object.

Among other important features, attention is invited to the compactness and durability of structure, the relatively low manufacturing and assembling costs, the ease of adjustment and the ease with which readings may be accurately taken.

Changes in the specific form of my invention, as herein disclosed, may be made within the scope of what is claimed without departing from the spirit of my invention.

Having described my invention, what I claim as new and desire to protect by Letters Patent is:

1. In an instrument of the class described, a barrel having a longitudinal wall therein dividing the same into two compartments, an eye-piece at one end of the barrel including a converging lens segment registering with one compartment, and a diverging lens segment registering with the other compartment, an adjustable object glass at the other end of the barrel, said diverging lens segment co-operating with said object glass to magnify distant objects through its respective compartment, a bubble tube carried by the barrel, a bubble reflector in the compartment registering with said converging lens segment, said reflector partially closing said compartment at the end opposite its respective lens segment, a leveling pointer traversing the space between said reflector and said longitudinal wall, the focal length of said converging lens segment being substantially equal to the distance of said pointer from said lens, also substantially equal to the distance of the bubble tube from the reflector plus the distance of the reflector from said lens.

2. In an instrument of the class described, a barrel-like body including an integral segmental core having a wall lying in a vertical plane intersecting the axis of said barrel, said wall together with the shell of said body forming a telescopic tube, said core having a longitudinal bore therein forming a compartment closely paralleling the telescopic tube and a vertical bore intersecting said longitudinal bore, an eye piece at one end of the body, a part thereof registering with the telescopic tube and a part with the longitudinal bore, an object glass at the other end of the body, a reflector plug fitted in said longitudinal bore and mutilated to admit light thereto through said object glass, a bubble tube crossing said vertical bore and a pointer traversing the space in said longitudinal bore unobstructed by said plug, said pointer being visible through said eye piece in connection with the bubble reflection on the plug and with a distant object through said object glass.

3. In an instrument of the class described, a barrel-like body including an integral, segmental core having a wall lying in a vertical plane intersecting the axis of said barrel, said wall together with the shell of said body forming a telescope tube, an axial eye-piece, at one end of the body, including a diverging lens segment registering with said tube and a converging lens segment, an object glass carried on the end of the body opposite said eye-piece, said core being formed with a longitudinal bore supplying a compartment closely paralleling the telescopic tube and with a vertical bore intersecting said longitudinal bore, a reflector in said longitudinal bore, a bubble tube lying longitudinally of the barrel and over said vertical bore, the inner side of said reflector falling short of the inner side of the longitudinal bore and forming a restricted opening for light admitted through said object glass and a pointer traversing said opening, said pointer and the bubble reflection being visible through said converging lens segment, the focal length of said lens segment being substantially equal to the distance of said pointer from said lens segment, also substantially equal to the distance of the bubble tube from the reflector plus the distance of said reflector from said lens segment.

4. In an instrument of the class described, a barrel, an eye-piece at one end and an object glass at the other end thereof, a bubble tube carried by the barrel, a reflector mounting, within the barrel, having a bubble reflecting surface thereon visible through said eye-piece, a cylindrical plug mounted transversely in said reflector mounting and adjustably revoluble therein, and a pointer carried by the plug in relation parallel with the axis thereof and offset therefrom, said pointer being magnified together with the bubble reflection through said eye-piece and observed in connection with said bubble reflection and a magnified distant object seen through said eye-piece and object glass.

5. An instrument of the present nature including a single barrel, a dividing wall in said barrel forming two parallel compartments therein, a single eye-piece common to both compartments, distant objects being visible through said eye-piece and one of said compartments, a converging lens segment in the eye-piece registering with the other compartment, a reflector in said last mentioned compartment removed from said wall, a pointer interposed between the reflector and said wall, and a bubble tube carried in proximity to the reflector, the bubble reflection, in said reflector, and said pointer being visible through and magnified by said converging lens segment, the view of said bubble reflection and of said pointer being associated with the view of distant objects yet shielded by said wall against vision impairing light from said first compartment.

In testimony whereof, I have signed my name to this specification.

ALBERT A. GROSSMANN.